(12) United States Patent
Lee

(10) Patent No.: US 11,584,039 B2
(45) Date of Patent: Feb. 21, 2023

(54) CUTTING MACHINE WITH ENVIRONMENT CONTROL ARRANGEMENT

(71) Applicant: Chao-Ying Lee, Riverside, CA (US)

(72) Inventor: Chao-Ying Lee, Riverside, CA (US)

( * ) Notice: Subject to any disclaimer, the term of this patent is extended or adjusted under 35 U.S.C. 154(b) by 10 days.

(21) Appl. No.: 17/074,241

(22) Filed: Oct. 19, 2020

(65) Prior Publication Data

US 2021/0114258 A1    Apr. 22, 2021

Related U.S. Application Data

(60) Provisional application No. 62/916,644, filed on Oct. 17, 2019.

(51) Int. Cl.
*B28D 7/02* (2006.01)
*B23D 47/02* (2006.01)
*B28D 1/04* (2006.01)
*B23D 59/00* (2006.01)

(52) U.S. Cl.
CPC .............. *B28D 7/02* (2013.01); *B23D 47/025* (2013.01); *B23D 59/006* (2013.01); *B28D 1/047* (2013.01)

(58) Field of Classification Search
CPC ........ B26D 7/18; B23Q 11/0046; B28D 7/02; B28D 1/047; B23D 47/025
See application file for complete search history.

(56) References Cited

U.S. PATENT DOCUMENTS 2,394,556 A * 2/1946 Martin .................... B24B 55/06
29/DIG. 60
4,144,781 A * 3/1979 Kreitz .................. B23D 59/006
83/100
5,172,680 A * 12/1992 Swan .................... B23D 59/006
125/12
6,960,124 B2 * 11/2005 Lee .......................... A47L 5/365
125/13.01
7,013,884 B2 * 3/2006 Guth .................. B23Q 11/0046
451/411

(Continued)

FOREIGN PATENT DOCUMENTS

KR        20150112648 A  * 10/2015   ............... B28D 7/02
WO    WO-2018147776 A1  *  8/2018   ............... B28D 7/02

OTHER PUBLICATIONS

KR20150112648A english translation; Oct. 2015 KR Bak Dong Sin.*

*Primary Examiner* — Laura M Lee
(74) *Attorney, Agent, or Firm* — Raymond Y Chan; David and Raymond

(57) ABSTRACT

A power saw machine for cutting a work piece includes a supporting frame, a cutting blade, and an environment control arrangement which includes a cutting table base, a sliding vacuum hood, and an outlet. The cutting table base is slidably supported by the supporting frame for supporting the work piece. The sliding vacuum hood has a narrow collecting chamber with a continuous inlet for directly contacting with the work piece to omit a spatial gap between the narrow collecting chamber and the work piece, wherein during the cutting process, a cutting portion of the cutting blade is entered into the narrow collecting chamber through the continuous inlet for cutting the work piece. The outlet is provided at the sliding vacuum hood for sucking residual debris of the work piece within the narrow collecting chamber during the cutting process.

13 Claims, 7 Drawing Sheets

(56) References Cited

U.S. PATENT DOCUMENTS

| | | | |
|---|---|---|---|
| 7,451,758 B2* | 11/2008 | Lee | B28D 1/047 125/13.01 |
| 2020/0094438 A1* | 3/2020 | Winterfjord | B28D 7/02 |
| 2021/0114258 A1* | 4/2021 | Lee | B28D 7/02 |

* cited by examiner

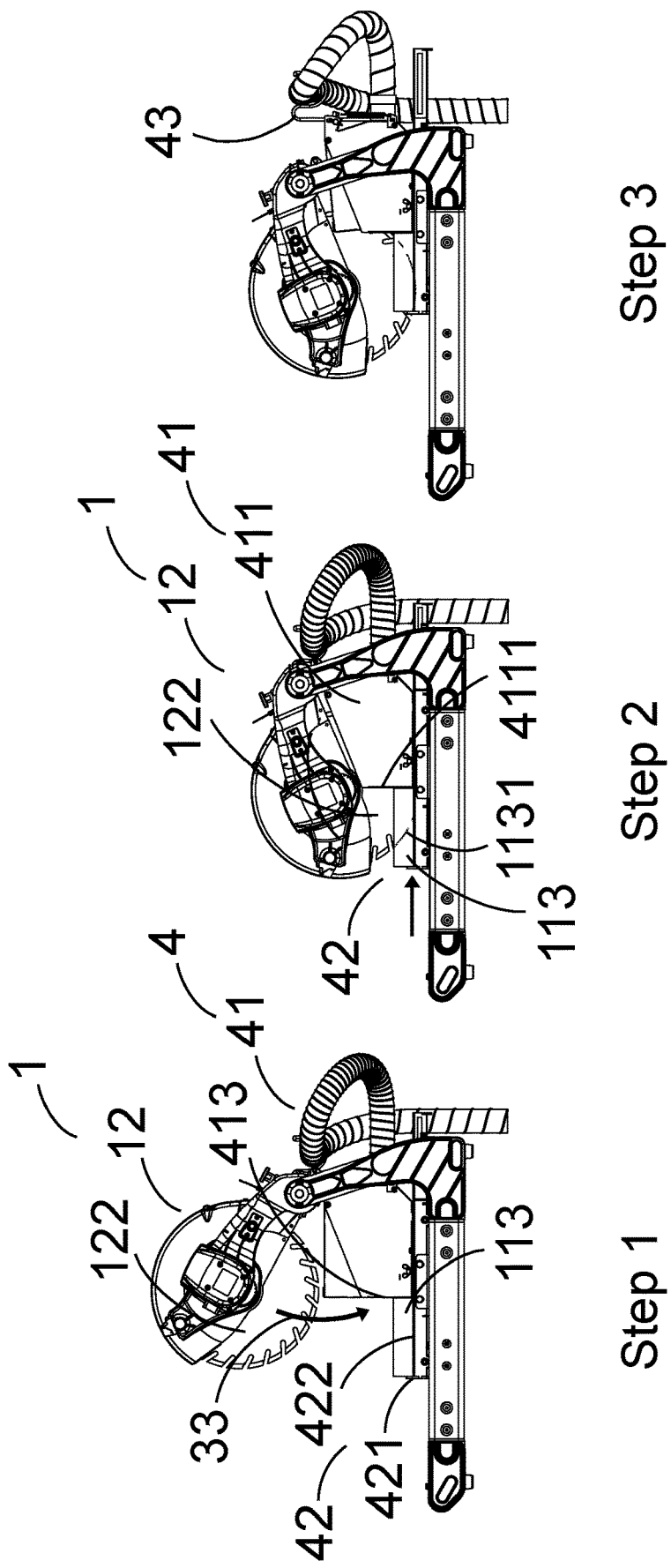

CUTTING MACHINE WITH ENVIRONMENT CONTROL ARRANGEMENT

CROSS REFERENCE OF RELATED APPLICATION

This is a non-provisional application that claims priority to U.S. provisional application, application No. 62/916,644, filed Oct. 17, 2019, the entire contents of each of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a power saw machine, in particular to a saw machine with a slidably mounted cutting table system that has an integrated environment control arrangement that effectively collect the residual particles ejected during the cutting process so as to improve the quality of air in the environment.

DESCRIPTION OF RELATED ARTS

Conventional cutting machines are widely used in various industries for provision of rapid and high quality cutting of such construction and manufacturing materials as granite, marble, slate, pave, brick, ceramics, and masonry. A conventional cutting machine generally comprises a cutting platform for supporting a work piece thereon, and a cutter head which is suspended and supported above the cutting platform, wherein the cutter head comprises a cutting blade driven by a motor to cut the work piece laid on the cutting platform. In particular, the cutting blade is rotated at a spin direction to define a cutting point at the circumferential edge of the cutting blade, wherein the front cutting point of the cutting blade contacts with the work piece to cut through the work piece.

Referring to FIGS. 1, 2 and 3 of the drawings, a conventional power saw machine 1 equipped with a traditional environment control arrangement 2 illustrated to be ejecting residual particles 31 from the cutting process 3. A conventional power saw machine 1 is comprised of a supporting frame 11 and a cutting head arrangement 12. A supporting frame 11 is comprised of a structural frame 111 and a cutting table 112 slidably mounted on the structural frame 111 for supporting a work piece 113. A cutting head arrangement 12 is comprised of a driving motor 121 and a cutting blade 122 that is driven to rotate by the driving motor 121. The cutting head arrangement 12 is supported by the structural frame 111 to be overhanging the cutting table 112, thereby positioning the cutting blade 122 such that it can engage the work piece 113 to cut it.

A traditional environment control arrangement 2 comprises a collecting chamber 21 that is concave in shape, wherein the opening of the collecting chamber 21 defined as the inlet 211 is positioned to be facing towards the cutting table 112 and the base of the chamber is positioned to be facing away from the cutting table 112. The base of the chamber is to have an opening defined as the outlet 212 where there is a suction source 22. The suction source 22 is positioned whereby the collecting chamber 21 can communicate suction from the outlet 212, an opening with a smaller area, to the inlet 211, and opening with a larger area. If the inlet 211 and outlet 212 areas have a large difference, the suction force left at the inlet 211 generated by the suction source 22 will be greatly weakened. To compensate a stronger suction source 22 is traditionally needed which correlates to costlier investment of a stronger vacuum for the user. If suction is insufficient it will not create enough negative suction force of the nearby residual particles 31 ejected from the cutting process 3 to effectively capture it.

Referring to FIG. 3 of the drawings, an illustration of a conventional power saw machine 1 equipped with a traditional environment control arrangement 2 ejecting residual particles 31 from the beginning to the end of a traditional cutting process wherein a spatial gap 32 always exists between the collecting chamber 21 inlet 211 and the work piece 113, as a result the suction source 22 must generate a substantial amount of negative suction force to effectively collect all ejected residual debris 31 from the cutting process 3.

SUMMARY OF THE PRESENT INVENTION

The invention is advantageous in that it provides a power saw machine with an environment control arrangement that effectively collect the residual particles ejected during the cutting process so as to improve the quality of air in the environment.

Another advantage of the invention is to provide a power saw machine with an environment control arrangement, which comprises a sliding vacuum hood for directly contacting with the work piece to omit a spatial gap between the narrow collecting chamber and the work piece so as to enhance the suction force for collecting residual debris of the work piece.

Another advantage of the invention is to provide a power saw machine with an environment control arrangement, wherein the sliding vacuum hood has a narrow collecting chamber with a continuous inlet to receive a cutting portion of the cutting blade so as to effectively collect the residual debris within the narrow collecting chamber when the cutting portion of the cutting blade contacts the work piece.

Another advantage of the invention is to provide a power saw machine with an environment control arrangement, wherein the work piece is not only secured between the material guide of the cutting table base and the forward plane of the sliding vacuum hood for preventing any unwanted movement of the work piece during the cutting process, but also biased against the forward plane of the sliding vacuum hood for minimizing the spatial gap between the work piece and the sliding vacuum hood so as to effectively collect the residual debris of the work piece.

Another advantage of the invention is to provide a power saw machine with an environment control arrangement, wherein the opening area difference between the continuous inlet and the outlet is relatively small to minimize the suction loss of the suction source to the narrow collecting chamber, so as to effectively collect the residual debris of the work piece.

Another advantage of the invention is to provide a power saw machine with an environment control arrangement, wherein the continuous inlet is formed in multiple planar surfaces to receive the cutting portion of the cutting blade during the cutting process.

Another advantage of the invention is to provide a power saw machine with an environment control arrangement, wherein the environment control arrangement can be incorporated with any existing power saw machine.

Another advantage of the invention is to provide a power saw machine with an environment control arrangement, which does not require to alter the original structural design of the power saw machine, so as to minimize the manufacturing cost of the power saw machine incorporating with the environment control arrangement.

Another advantage of the invention is to provide a power saw machine with an environment control arrangement, wherein no expensive or complicated structure is required to employ in the present invention in order to achieve the above mentioned objects. Therefore, the present invention successfully provides an economic and efficient solution for providing an environment friendly configuration for the collecting the residual debris of the work piece during the cutting process.

Additional advantages and features of the invention will become apparent from the description which follows, and may be realized by means of the instrumentalities and combinations particular point out in the appended claims.

According to the present invention, the foregoing and other objects and advantages are attained by a power saw machine for cutting a work piece, comprising:

a supporting frame;

a cutting head arrangement which comprises a cutting blade driven to rotate for cutting the work piece during a cutting process; and an environment control arrangement, which comprises:

a cutting table base slidably supported by the supporting frame for supporting the work piece on the cutting table base;

a sliding vacuum hood having a narrow collecting chamber with a continuous inlet for directly contacting with the work piece to omit a spatial gap between the narrow collecting chamber and the work piece, wherein during the cutting process, a cutting portion of the cutting blade is entered into the narrow collecting chamber through the continuous inlet for cutting the work piece; and an outlet provided at the sliding vacuum hood for connecting to a suction source, wherein the outlet is commutated with the continuous inlet for sucking residual debris of the work piece within the narrow collecting chamber during the cutting process.

In accordance with another aspect of the invention, the present invention comprises an environment control arrangement for a power saw machine which comprises a cutting blade being dropped down to cut a work piece, wherein the environment control arrangement comprises:

a cutting table base for supporting the work piece thereon;

a sliding vacuum hood which comprises an upper plane having an actuating chamber therein and a forward plane having a static chamber therein, wherein the actuating chamber and the static chamber are communicated with each other to form a narrow collecting chamber with a continuous inlet for directly contacting with the work piece to omit a spatial gap between the narrow collecting chamber and the work piece, wherein the narrow collecting chamber is configured for receiving a cutting portion of the cutting blade into the narrow collecting chamber through the continuous inlet to cut the work piece during a cutting process;

an outlet provided at a rear side of the sliding vacuum hood for connecting to a suction source, wherein the outlet is commutated with the continuous inlet for sucking residual debris thereat during the cutting process.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 7 is a side view of a power saw machine with an environment control arrangement that is a preferred embodiment of the present invention, illustrating the beginning of the cutting process to the end of the cutting process.

DETAILED DESCRIPTION OF THE PREFERRED EMBODIMENT

Figure 1:
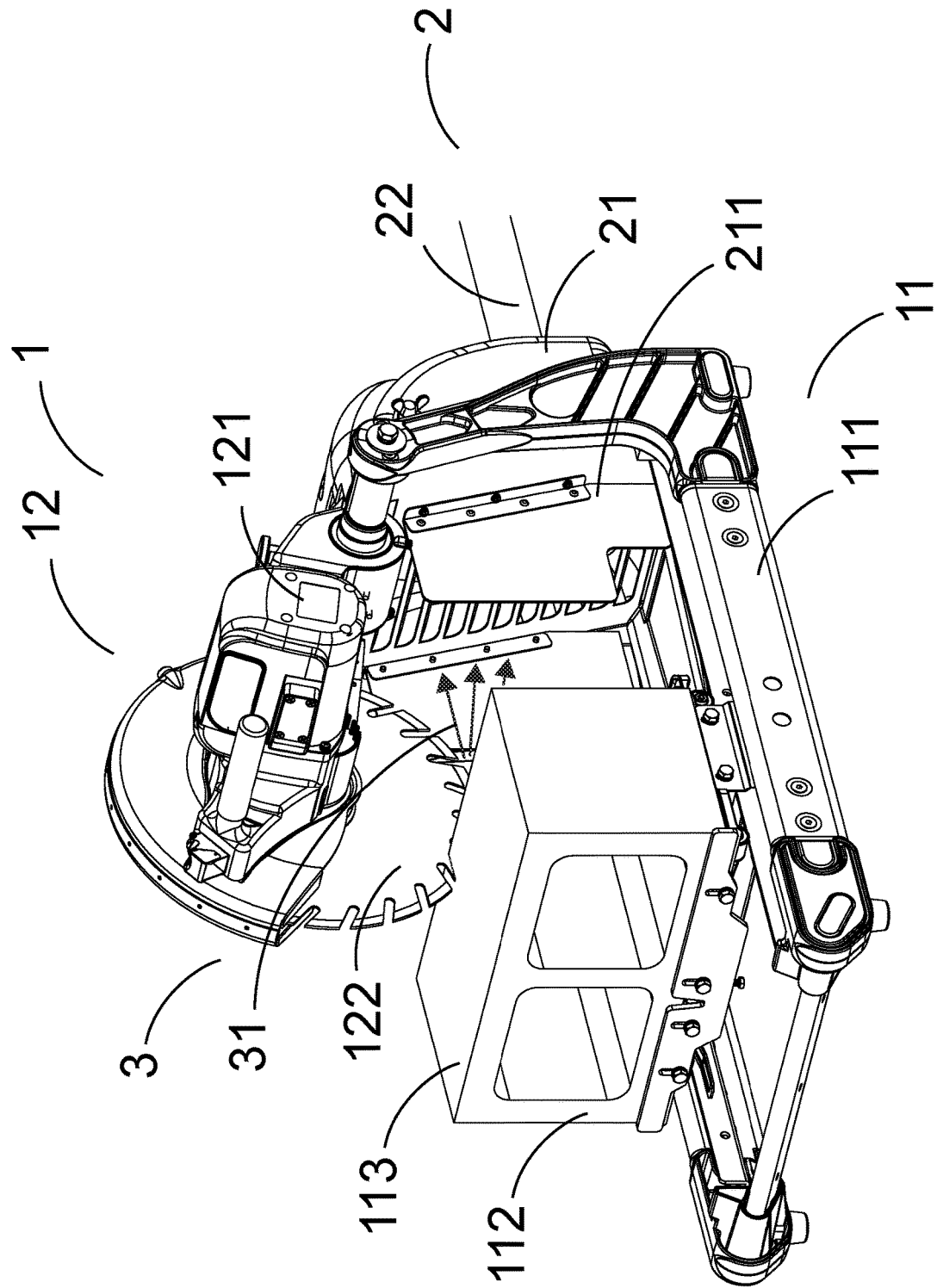
FIG. 1 is a perspective view of a conventional power saw machine using a traditional environment control arrangement to collect residual debris from the work piece during the cutting process.
Figure 2:
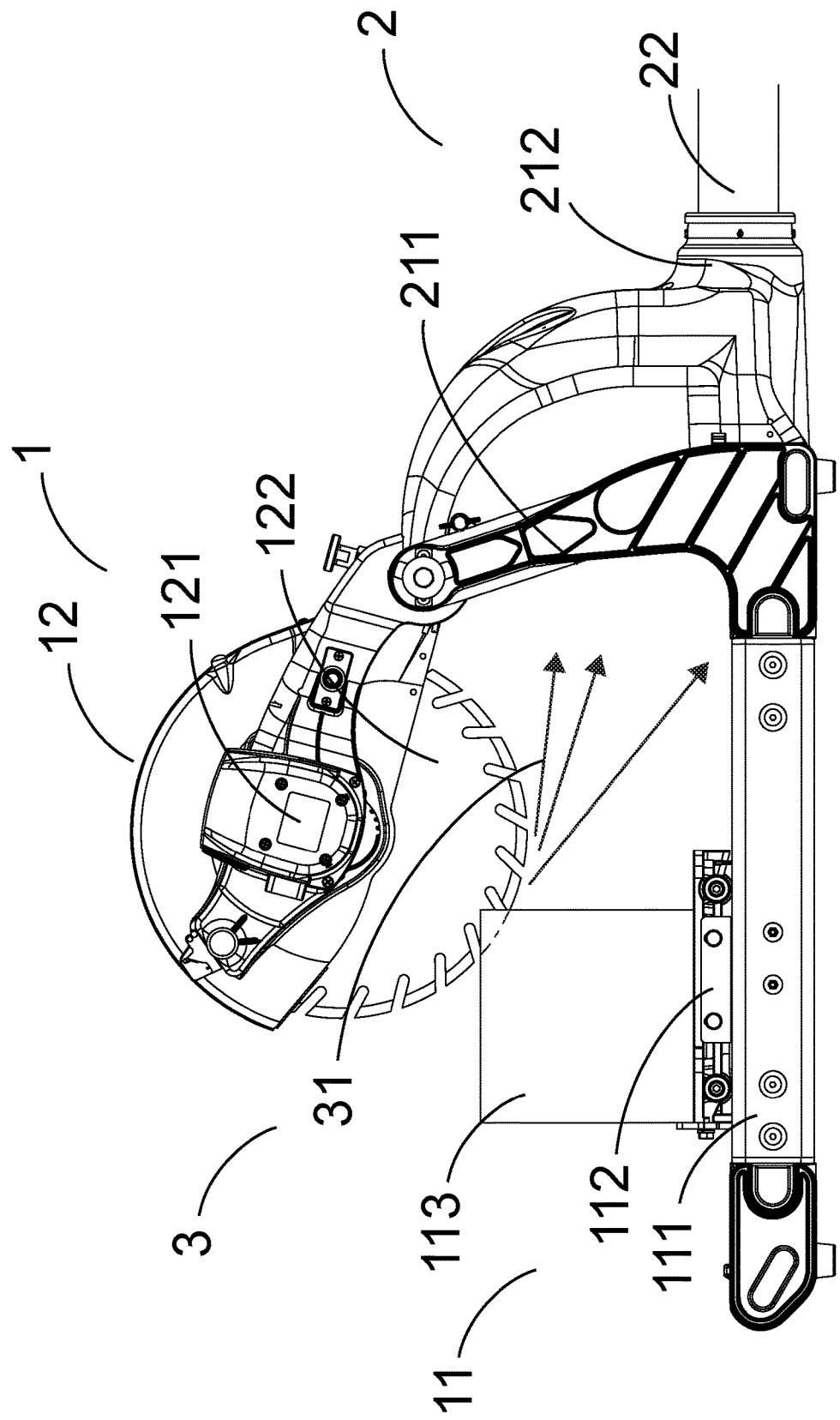
FIG. 2 is a side view of a conventional power saw machine using a traditional environment control arrangement to collect residual debris ejected from the work piece during the cutting process.
Figure 3:
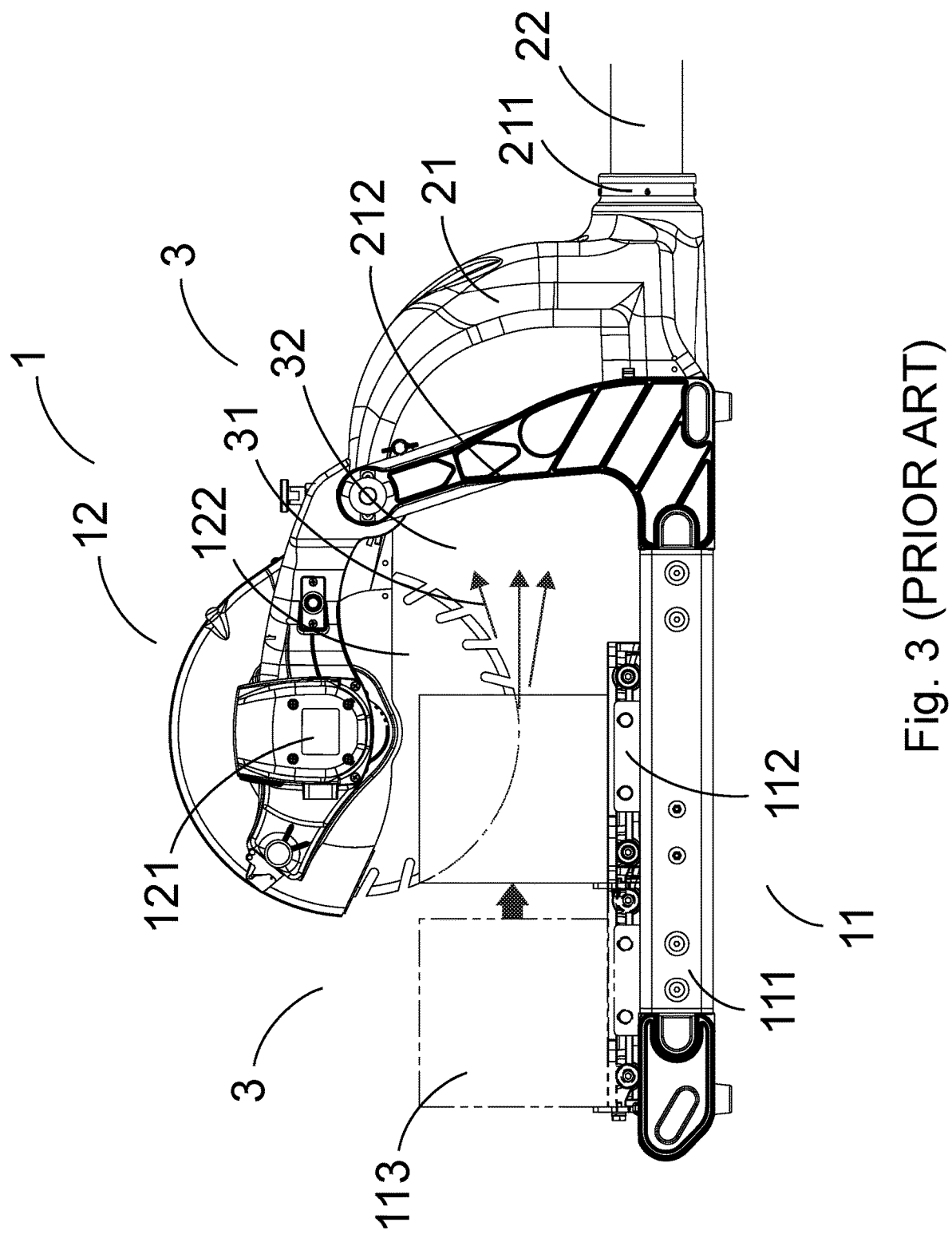
FIG. 3 is a side view of an illustration of the spatial gap that exist between the ejected residual particles from the work piece during the cutting process and the traditional environment control arrangement mounted on a conventional power saw machine.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 4, 5, 6 and 7 of the drawings, a power saw machine 1 equipped with an environment control arrangement 4 that is a preferred embodiment of the present invention. The power saw machine 1, which can be a conventional power machine, is comprised of a cutting head arrangement 12 and a supporting frame 11. A supporting frame 11 is comprised of a cutting table 112 slidably mounted on a structural frame 111, in addition of the structure frame 111 has features that form an axis from where the cutting head arrangement 12 will rotate about. The cutting head arrangement 12 is pivotally connected to the supporting frame 11. The cutting head arrangement 12 comprises a driving motor 121 and a cutting blade 122 that is driven to rotate by the driving motor 121. The cutting head arrangement 12 is supported by the structural frame 111 to be overhanging the environment control arrangement 4, thereby positioning the cutting blade 122 such that it can engage the work piece 113 to cut it.

The environment control arrangement 4 comprises a sliding vacuum hood 41, and a cutting table base 42 slidably mounted to the structural frame 111 for supporting a work piece 113. The cutting table base 42 is comprised of a material guide 421 that is planarly mounted perpendicular to the sliding direction of the cutting table base 42 and the cutting blade 122 plane, and the work surface 422 plane that is perpendicular to the cutting blade 122 and the material guide 421 plane.

In other words, the cutting table base 42 has a L-shaped configuration to define the work surface 422 at a horizontal level and the material guide 421 at a vertical level. The cutting table base 42 further has an elongated guiding slot 420 formed on the work surface 422 to align with the cutting blade 122, wherein the elongated guiding slot 420 is indented on the work surface 422. Preferably, the elongated guiding slot 420 is further extended from the work surface 422 to the material guide 421. In other words, a portion of the elongated guiding slot 420 is formed at the material guide 421 while another portion of the elongated guiding slot 420 is formed at the work surface 422.

Figure 4:
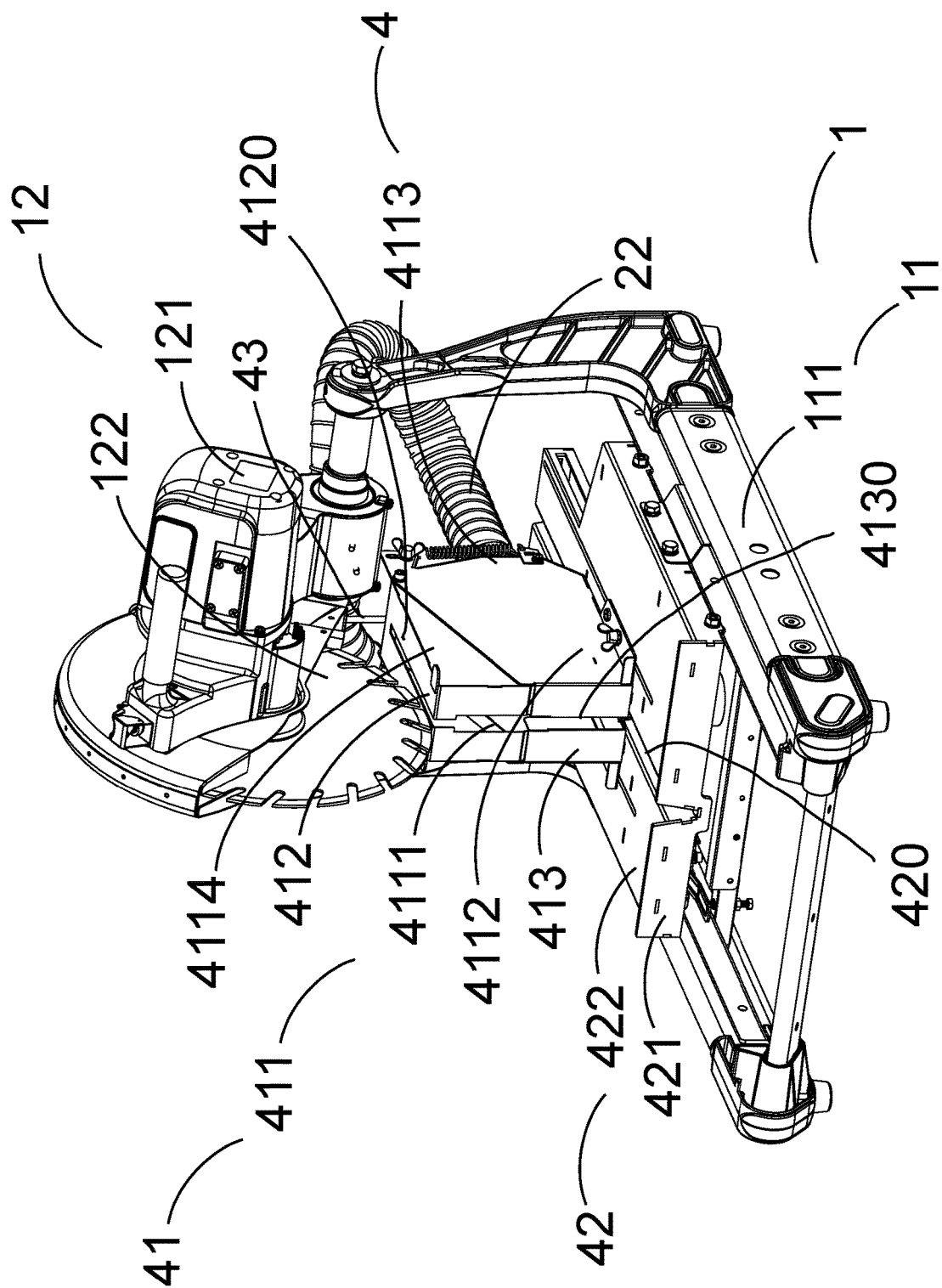
FIG. 4 is a perspective view of a power saw machine with an environment control arrangement that is a preferred embodiment of the present invention.

As shown in FIG. 4, the sliding vacuum hood 41 comprises a narrow collecting chamber 411 that is concave shape and has opening that is comprised of a static chamber 4112 and an actuating chamber 4114 that can react to the proximity of the cutting head arrangement 12. The base of the narrow collecting chamber 411 is positioned to be facing away from the material guide 421. The base is to have an opening defined to be the outlet 4113 and is to be the position of the suction source 22. The static chamber 4112 and actuating chamber 4114 together form multiple planar surfaces with a slot in the middle bisecting them to form a continuous inlet 4111, that are positioned such that the cutting blade 122 can partially enter the sliding vacuum hood 41 through the upper plane 412 and the forward plane 413, if lowered from the overhanging position. In addition, if the cutting head arrangement 12 contacts the sliding vacuum hood 41, the actuating chamber 4114 will rotate inwards in conjunction with the cutting head arrangement 12.

Accordingly, the narrow collecting chamber 411 is configured for directly contacting with the work piece 113 to omit a spatial gap between the narrow collecting chamber 411 and the work piece 113, wherein during the cutting process, a cutting portion of the cutting blade 122 is entered into the narrow collecting chamber 411 through the continuous inlet 4111 for cutting the work piece 113. The cutting portion of the cutting blade 122 is a portion of the cutting blade 122 after contacting and cutting the work piece 113 during the cutting process. It is worth mentioning that the narrow collecting chamber 411 has a planar configuration corresponding to the cutting blade 122 in a planar direction.

As shown in FIG. 4, the actuating chamber 4114 is defined at the upper plane 412 while the static chamber 4112 is defined at the forward plane 413, wherein the actuating chamber 4114 and the static chamber 4112 are communicated with each other to form the narrow collecting chamber 411, such that the continuous inlet 4111 is formed in multiple planar surfaces to receive the cutting portion of the cutting blade 122 during the cutting process.

According to the preferred embodiment, the upper plane 412 has an elongated upper opening slot 4120 communicating with the actuating chamber 4114 to form a portion of the continuous inlet 4111 for the cutting portion of the cutting blade 122 into the actuating chamber 4114 via the elongated upper opening slot 4120. Furthermore, the forward plane 413 has an elongated forward opening slot 4130 communicating with the static chamber 4112 to form another portion of the continuous inlet 4111 for the cutting portion of the cutting blade 122 into the static chamber 4112 via the elongated forward opening slot 4130. In other words, the continuous inlet 4111 is constructed by the elongated upper opening slot 4120 and the elongated forward opening slot 4130, the continuous inlet 4111 is formed in multiple planar surfaces to receive the cutting portion of the cutting blade 122 during the cutting process. Preferably, an upper plane surface of the upper plane 412 and a forward plane surface of the forward plane 413 are perpendicular to each other. During the cutting process, the cutting blade 122 is dropped down, preferably pivotally moved, to enter into the narrow collecting chamber 411 through the elongated upper opening slot 4120 and the elongated forward opening slot 4130.

According to the preferred embodiment, the actuating chamber 4114 is located above the static chamber 4112. Preferably, a depth of the actuating chamber 4114 from the upper plane 412 is gradually reduced from the forward plane 413 of the sliding vacuum hood 41 to the rear side thereof. Likewise, a depth of the static chamber 4112 from the bottom side is gradually increased from the forward plane 413 of the sliding vacuum hood 41 to the rear side thereof.

Accordingly, a width of the elongated upper opening slot 4120 is larger than a thickness of the cutting blade 122. Preferably, a width of the elongated forward opening slot 4130 is larger than the width of the elongated upper opening slot 4120. In other words, a width of the actuating chamber 4114 is smaller than a width of the static chamber 4112. It is worth mentioning that the width of the elongated upper opening slot 4120 should be as small as possible to minimize the suction loss therethrough. The width of the elongated upper opening slot 4120 should be slightly larger than the thickness of the cutting blade 122 for allowing the cutting blade 122 entering through the elongated upper opening slot 4120. As shown in FIG. 4, a width of an upper portion of the actuating chamber 4114 is smaller than a width of a lower portion of the actuating chamber 4114.

The width of the static chamber 4112 is uniform. Furthermore, the elongated guiding slot 420 formed on the work surface 422 is aligned and communicated with the continuous inlet 4111. Particularly, the elongated guiding slot 420 is aligned and communicated with the elongated forward opening slot 4130.

The outlet 4113 is provided at the sliding vacuum hood 41 for connecting to the suction source 22, wherein the outlet 4113 is commutated with the continuous inlet 4111 for sucking residual debris of the work piece 113 within the narrow collecting chamber 411 during the cutting process.

Figure 5:
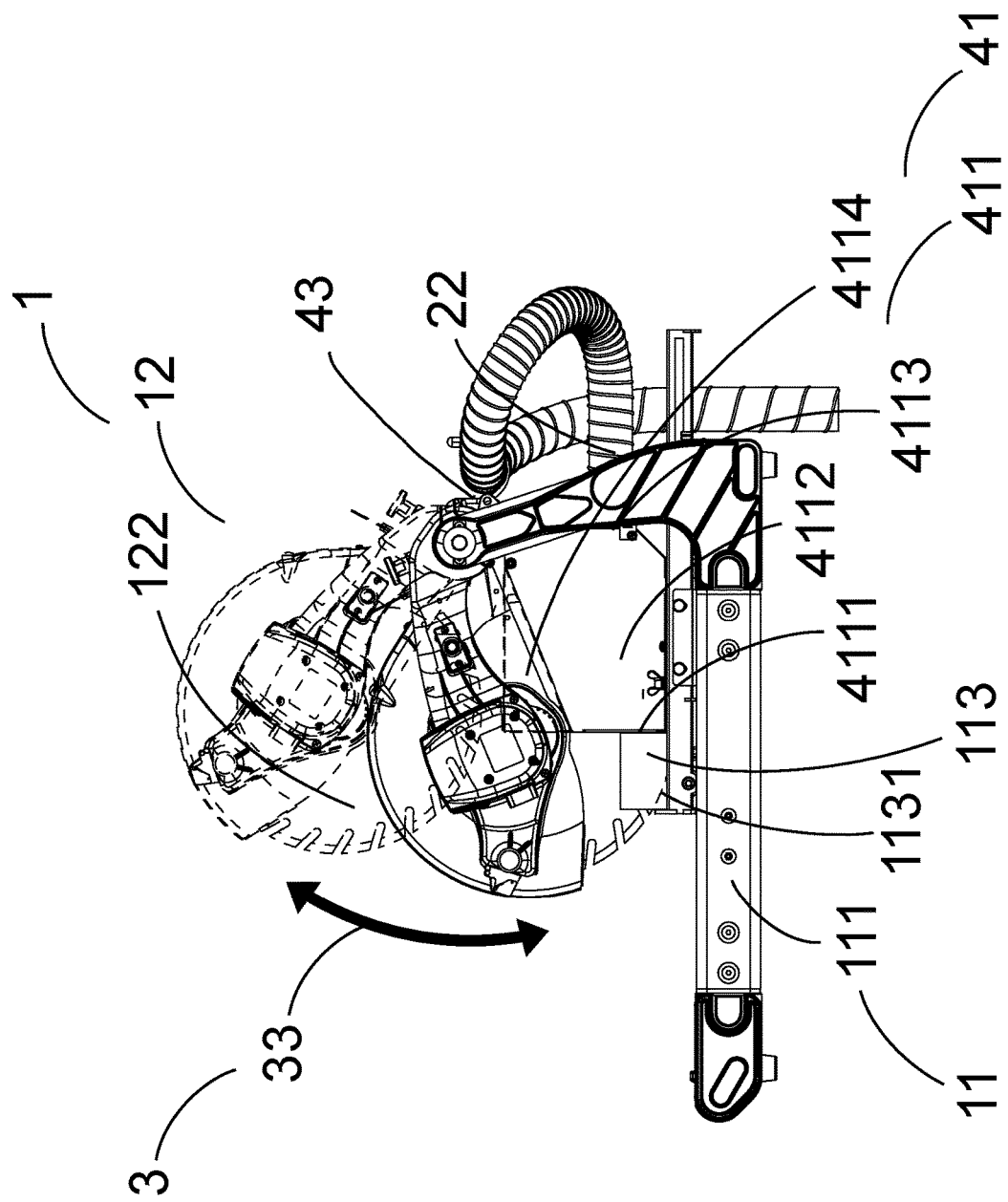
FIG. 5 is a side view of a power saw machine with an environment control arrangement that is a preferred embodiment of the present invention, illustrating the cutting head arrangement interacting with the sliding vacuum hood of the environment control arrangement.

As shown in FIG. 5, an illustration of a cutting process 3 known as plunge cutting 33, wherein the cutting head arrangement 12 is driven to be rotated towards the environment control arrangement 4. Performing this action first in a cutting process 3 allows the cutting blade 122 to cut a channel 1131 in the work piece 113 whereby restricting ejected residual particles 31 from the cutting process 3 to stay within the channel 1131 to be effectively captured by the sliding vacuum hood 41 through the continuous inlet 4111. It is worth mentioning that there is no spatial gap 32 between the work piece 113 and the narrow collecting chamber 411 thereby reducing the suction force amount needed to effectively collect the residual debris 31 from the cutting process 3, in addition the negative suction force generated by the suction source 22 communicated through the outlet 4113 opening area and continuous inlet 4111 opening area has less suction loss due to the small different between the areas in the two openings. This benefit enables using a suction source 22 of a lesser strength, which translate into smaller investment of a vacuum system, than if a user was having to consider negative force suction loss as mentioned above when using a traditional environment control arrangement 2.

Figure 6:
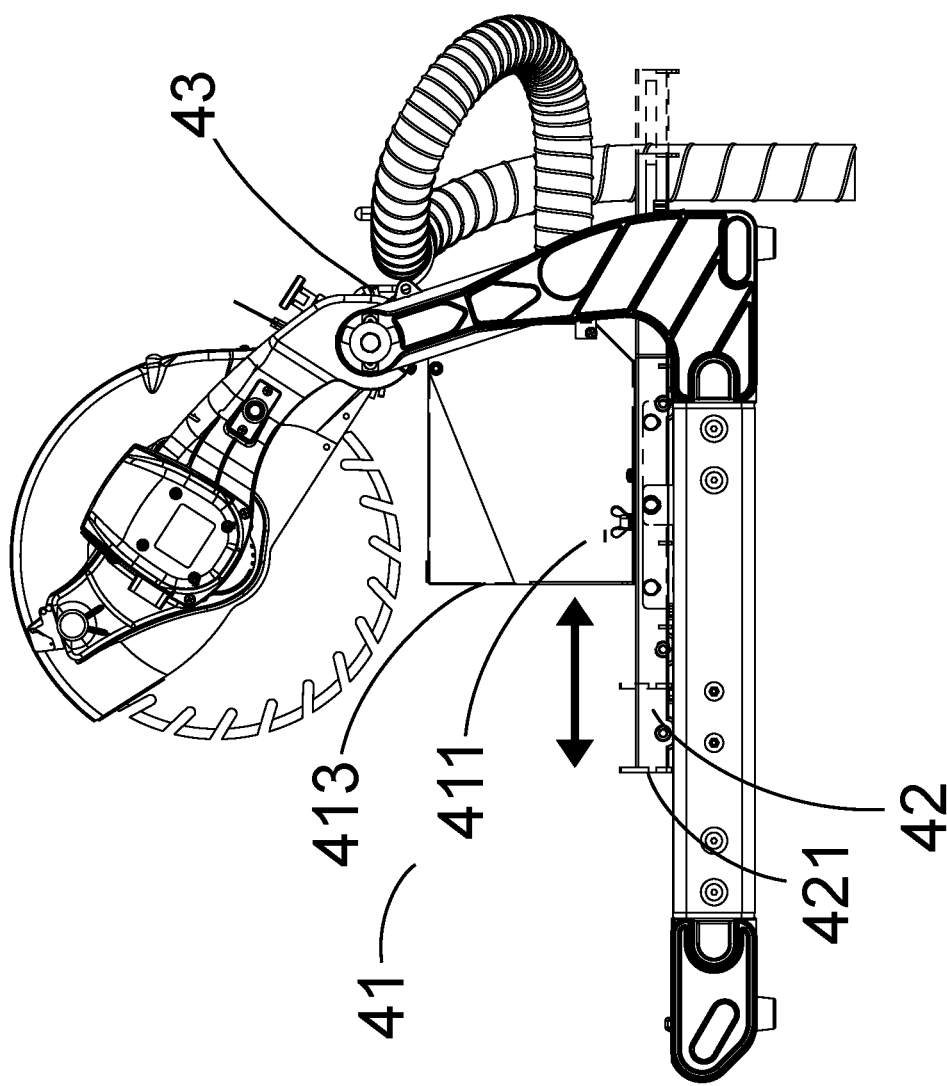
FIG. 6 is a side view of a power saw machine with an environment control arrangement that is a preferred embodiment of the present invention, illustrating the sliding vacuum hood adjustability about cutting table base.

As shown in FIG. 6, an illustration of the adjustability of the sliding vacuum hood 41 with respect to the cutting table base 42 wherein any size work piece 113 supported on the cutting table base 42 work surface 422 will be held in place by means of contact by the material guide 421 and the sliding vacuum hood 41 forward plane 413 leaving no spatial gap 32 thereof. In other words, a front surface of the work piece 113 is biased against the material guide 421 while a rear surface of the work piece 113 is biased against the forward plane hood 413 of the sliding vacuum hood 41.

As shown in FIG. 7, an illustration of cutting process 3 when the power saw machine 1 equipped with an environment control arrangement 4 that is a preferred embodiment of the present invention summarized in three steps:

Step 1, the environment control arrangement 4 is illustrated to be adjusted to the size of the work piece 113, wherein the cutting table base 42 work surface 422 is supporting the work piece 113 while being held in place by means of contact by the material guide 421 and the sliding vacuum hood 41 forward plane 413 leaving no spatial gap 32 thereof. Then the plunge cutting 33 cutting process 3 can begin.

It is worth mentioning that the sliding vacuum hood 41 is slidably mounted on the cutting table base 42 to selectively adjust a distance between the material guide 421 and the forward plane 413 of the sliding vacuum hood 41 for fitting the size of the work piece 113. Once the work piece 113 is biased between the material guide 421 and the forward plane 413 of the sliding vacuum hood 41, the sliding vacuum hood 41 is locked on the cutting table base 42 via lockers, such as hand-screws, so as to lock up the work piece 113 on the work surface 422.

Step 2, illustrates completing the plunge cutting 33 process, wherein the cutting blade 122 will had cut a channel 1131 in the work piece 113 thereby restricting the ejected residual debris 31 to stay within the channel 113 to be effectively captured by the sliding vacuum hood 41 through the continuous inlet 4111, before the cutting table base 42 is driven towards the cutting blade 122 separating the work piece 113 into two pieces. Accordingly, the cutting blade 122 is dropped down to enter into the narrow collecting chamber 411 through the continuous inlet 4111, i.e. the elongated upper opening slot 4120 and the elongated forward opening slot 4130, in order to contact with the work piece 113. The cutting table base 42 is slid to the cutting blade 122, such that the work piece 113 is guided to slide and to be cut by the cutting blade 122. Furthermore, the channel 1131 in the work piece 113 cut by the cutting blade 122 is formed to align with the elongated forward opening slot 4130 of the continuous inlet 4111 because the cutting blade 122 is entered into the narrow collecting chamber 411 through the continuous inlet 4111. Therefore, the residual debris 31 of the work piece 113 will be sucked from the channel 1131 into the narrow collecting chamber 411 through the continuous inlet 4111 during the cutting process.

It is worth mentioning that the elongated upper opening slot 4120 has a closed end facing toward the rear side of the sliding vacuum hood 41, wherein an open end of the elongated upper opening slot 4120 communicates with an upper end of the elongated forward opening slot 4130. The closed end of the elongated upper opening slot 4120 is not extended through the rear side of the sliding vacuum hood 41, wherein when the cutting blade 122 enters into the narrow collecting chamber 411, the cutting blade 122 cannot pass through the closed end of the elongated upper opening slot 4120.

Preferably, the environment control arrangement 4 further comprises a sliding stopper 43 provided at the rear side of the sliding vacuum hood 41 for limiting a forward sliding movement of the cutting table base 42. In one embodiment, the sliding stopper 43 is a stopper arm upwardly extended from the rear side of the sliding vacuum hood 41, wherein the stopper arm 43 is arranged to contact with the power saw machine 1 to indicate an initial position of the sliding vacuum hood 41. For example, an upper portion of the stopper arm 43 will hit the rear side of the cutting head arrangement 12. In other words, once the stopper arm 43 is contacted, the initial position of the sliding vacuum hood 41 is indicated to prevent the cutting blade 122 contacting the closed end of the elongated upper opening slot 4120 and to prevent the sliding vacuum hood 41 sliding further forward. Since the sliding stopper 43 is coupled at the rear side of the sliding vacuum hood 41, the sliding stopper 43 further serves as a hose hanger for holding a suction hose at the outlet 4113 to connect to the suction source 22.

Step 3, illustrates a complete cut and the work piece 113 is in two pieces. Then, the cutting blade 122 can be moved upwardly once the cutting process is completed.

It is worth mentioning that the environment control arrangement 4 can be incorporated with any existing power saw machine by simply mounting the cutting table base 42 to the frame of the existing power saw machine and locating the sliding vacuum hood 41 at a back side of the work piece 113 when the work piece 113 is placed on the cutting table base 42.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A power saw machine for cutting a work piece, comprising:
   a supporting frame;
   a cutting head arrangement which comprises a cutting blade driven to rotate for cutting the work piece during a cutting process; and
   an environment control arrangement, which comprises:
   a cutting table base slidably supported by said supporting frame for supporting the work piece on said cutting table base; and
   a sliding vacuum hood having an upper plane and a forward plane, wherein an actuating chamber is defined at said upper plane and a static chamber is defined at said forward plane, wherein said actuating chamber and said static chamber are communicating with each other to form a narrow collecting chamber which has a continuous inlet for directly contacting with the work piece to omit a spatial gap between said narrow collecting chamber and the work piece, and an outlet for connecting to suction source, wherein said narrow collecting chamber is configured in such a manner that, during said cutting process, a cutting portion of said cutting blade is entered into said narrow collecting chamber through said continuous inlet for cutting the work piece, wherein said outlet is communicated with said continuous inlet for sucking residual debris of the work piece within said narrow collecting chamber during said cutting process, wherein said continuous inlet is formed in multiple planar surfaces to receive said cutting portion of said cutting blade during said cutting process, wherein said continuous inlet is positioned such that said cutting blade is able to partially enter said sliding vacuum hood through said upper plane hood and said forward plane hood while said cutting blade is lowed from an overhanging position, wherein when said cutting head arrangement contacts said sliding vacuum hood, said actuating chamber rotates inwards in conjunction with said cutting head arrangement.

2. The power saw machine, as recited in claim 1, wherein said cutting table base comprises a work surface and a material guide perpendicular to said work surface for holding the work piece at a position that the work piece is supported on said work surface and is contacted and held between said material guide and said forward plane of said sliding vacuum hood.

3. The power saw machine, as recited in claim 2, wherein said cutting table base further has an elongated guiding slot formed on said work surface to align and communicate with said continuous inlet.

4. The power saw machine, as recited in claim 3, wherein when said cutting head arrangement is driven to be rotated towards said environment control arrangement, said cutting blade is dropped down to enter said cutting portion of said cutting blade into said narrow collecting chamber through said continuous inlet for cutting the work piece.

5. The power saw machine, as recited in claim 4, wherein said upper plane has an elongated upper opening slot which is communicating with said actuating chamber and forms a portion of said continuous inlet for said cutting portion of said cutting blade being entered into said actuating chamber via said elongated upper opening slot.

6. The power saw machine, as recited in claim 5, wherein said forward plane has an elongated forward opening slot communicating with said static chamber to form a portion of said continuous inlet for said cutting portion of said cutting blade into said static chamber via said elongated forward opening slot.

7. The power saw machine, as recited in claim 6, wherein an upper plane surface of said upper plane and a forward plane surface of said forward plane are perpendicular to each other.

8. The power saw machine, as recited in claim 7, wherein a width of said actuating chamber is smaller than a width of said static chamber.

9. The power saw machine, as recited in claim 8, wherein said outlet is provided at a rear side of said sliding vacuum hood.

10. The power saw machine, as recited in claim 1, wherein said upper plane has an elongated upper opening slot which is communicating with said actuating chamber and forms a portion of said continuous inlet for said cutting portion of said cutting blade being entered into said actuating chamber via said elongated upper opening slot.

11. The power saw machine, as recited in claim 1, wherein said forward plane has an elongated forward opening slot communicating with said static chamber to form a portion of said continuous inlet for said cutting portion of said cutting blade into said static chamber via said elongated forward opening slot.

12. The power saw machine, as recited in claim 1, wherein an upper plane surface of said upper plane and a forward plane surface of said forward plane are perpendicular to each other.

13. The power saw machine, as recited in claim 1, wherein a width of said actuating chamber is smaller than a width of said static chamber.

\* \* \* \* \*